United States Patent
Jiang et al.

(10) Patent No.: US 10,446,993 B2
(45) Date of Patent: Oct. 15, 2019

(54) DATA CONNECTION CABLE FOR VIRTUAL REALITY GLASSES AND APPARATUS INCLUDING THE SAME

(71) Applicant: BEIJING XIAOMI MOBILE SOFTWARE CO., LTD., Beijing (CN)

(72) Inventors: Hao Jiang, Beijing (CN); Shun Wang, Beijing (CN); Wenhui Ding, Beijing (CN); Huiming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/968,544

(22) Filed: May 1, 2018

(65) Prior Publication Data
US 2019/0027879 A1 Jan. 24, 2019

(30) Foreign Application Priority Data
Jul. 19, 2017 (CN) .......................... 2017 1 0592661

(51) Int. Cl.
*H01R 11/00* (2006.01)
*H01R 31/06* (2006.01)
(Continued)

(52) U.S. Cl.
CPC ......... *H01R 31/06* (2013.01); *G02B 27/0176* (2013.01); *H01R 13/73* (2013.01);
(Continued)

(58) Field of Classification Search
CPC .................... H01R 31/06; H01R 13/73; G02B 2027/0169; G02B 27/0176; G02B 6/4416; H04N 5/2252
(Continued)

(56) References Cited

U.S. PATENT DOCUMENTS 8,394,560 B2  3/2013 Yu et al.
2010/0209058 A1*  8/2010 Ott ....................... G02B 6/4416
                                                               385/101
(Continued)

FOREIGN PATENT DOCUMENTS

CN        105866954 A        8/2016
CN        106019597 A        10/2016
(Continued)

OTHER PUBLICATIONS

Office Action issued in corresponding Russian Application No. 2018109238/08(014215), dated Dec. 14, 2018, 6 pages.
(Continued)

*Primary Examiner* — Jean F Duverne
(74) *Attorney, Agent, or Firm* — Arch & Lake LLP

(57) ABSTRACT

A data connection cable for virtual reality glasses and an apparatus including the same are provided. The data connection cable includes a first connecting plug at a first end, the first connecting plug being fitted to a first interface on the virtual reality glasses, such that the data connection cable is detachably connected to the virtual reality glasses, and a second connecting plug at a second end, the second connecting plug being fitted to a second interface of an external electronic device assembled to the virtual reality glasses. The data connection cable may be detachably connected to the glasses body of the virtual reality glasses so that the user can replace the data connection cable for the virtual reality glasses according to the interface type of the external electronic device so as to accommodate to external electronic devices of different interface types.

19 Claims, 16 Drawing Sheets

(51) Int. Cl.
   *G02B 27/01* (2006.01)
   *H01R 13/73* (2006.01)
(52) U.S. Cl.
   CPC ............... *G02B 2027/0156* (2013.01); *G02B 2027/0169* (2013.01)
(58) Field of Classification Search
   USPC ........................................................ 439/502
   See application file for complete search history.

(56) References Cited

U.S. PATENT DOCUMENTS

| | | |
|---|---|---|
| 2011/0008980 A1 | 1/2011 | Obata et al. |
| 2015/0253574 A1 | 9/2015 | Thurber |
| 2015/0348327 A1 | 12/2015 | Zalewski |
| 2016/0209658 A1 | 7/2016 | Zalewski |
| 2016/0267712 A1 | 9/2016 | Nartker et al. |
| 2018/0140177 A1* | 5/2018 | Liu ..................... H04N 5/2252 |

FOREIGN PATENT DOCUMENTS

| | | |
|---|---|---|
| CN | 106154555 A | 11/2016 |
| CN | 205899147 U | 1/2017 |
| CN | 107275904 A | 10/2017 |
| EP | 2990854 B1 | 7/2017 |
| EP | 3287865 A2 | 2/2018 |
| RU | 2602363 C2 | 11/2016 |
| RU | 2621488 C2 | 6/2017 |
| RU | 2621633 C2 | 6/2017 |

OTHER PUBLICATIONS

Extended European search report issued in corresponding European Application No. 18182495.4, dated Dec. 19, 2018, 8 pages.
Notice of Allowance issued in corresponding Russian Application No. 2018109238/08(014215) dated Mar. 5, 2019, 7 pages.
International Search Report (including English translation) issued in corresponding International Application No. PCT/CN2017/112880, dated Feb. 24, 2018, 4 pages.

* cited by examiner

US 10,446,993 B2

DATA CONNECTION CABLE FOR VIRTUAL REALITY GLASSES AND APPARATUS INCLUDING THE SAME

CROSS REFERENCE TO RELATED APPLICATION

The present application is based upon and claims priority to Chinese Patent Application No. CN201710592661.1, filed on Jul. 19, 2017, and the entire contents thereof are incorporated herein by reference.

TECHNICAL FIELD

The present disclosure generally relates to the field of terminal technology, and more particularly, to a data connection cable for virtual reality glasses.

BACKGROUND

Virtual Reality (VR) technology is a computer simulation system that can generate a simulation environment through three-dimensional dynamic visualization and interaction of physical behaviors, to provide a user with an immersive experience of application.

In the related art, a simple virtual reality solution is proposed by providing virtual reality glasses containing virtual reality function components and playing virtual reality content by external electronic devices such as a user's cell phone, tablet or the like.

However, since the sizes, specifications, materials and the like of the different external electronic devices are significantly different, if the electronic devices cannot be effectively limited, the electronic devices are prone to jitter and sway during usage, which may affect users' immersive experience in the process and may even cause discomfort to the user such as dizziness.

SUMMARY

The present disclosure provides a data connection cable for virtual reality glasses, to overcome the above technical problem in the related art.

According to a first aspect of the present disclosure, there is provided a data connection cable for virtual reality glasses, including: a first connecting plug and a second connecting plug. The first connecting plug is at a first end of the data connection cable. The first connecting plug is fitted to a first interface on an eyeglass body of the virtual reality glasses, such that the data connection cable is detachably connected to the eyeglass body. The second connecting plug is at a second end. The second connecting plug is fitted to a second interface of an external electronic device assembled to the eyeglass body.

According to a second aspect, a virtual reality apparatus includes virtual reality glasses and a data connection cable. The data connection cable includes: a first connecting plug at a first end of the data connection cable, where the first connecting plug is fitted to a first interface on an eyeglass body of the virtual reality glasses, such that the data connection cable is detachably connected to the eyeglass body. The data connection cable also includes a second connecting plug at a second end of the data connection cable, where the second connecting plug is fitted to a second interface of an external electronic device assembled to the eyeglass body.

It may be seen from the above embodiments that, the data connection cable in the present disclosure may be detachably connected to the glasses body of the virtual reality glasses so that the user can replace the data connection cable for the virtual reality glasses according to the interface type of the external electronic device so as to accommodate to external electronic devices of different interface types, improving the versatility of virtual reality glasses.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to".

Figure 1:
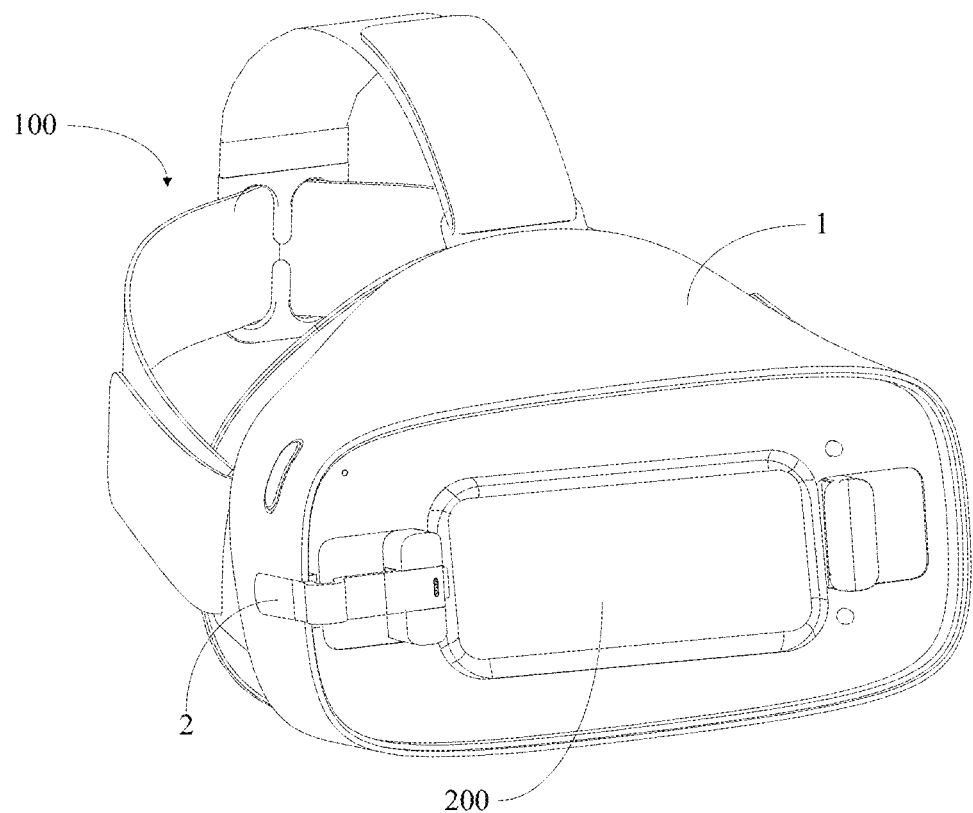
FIG. 1 is a diagram illustrating an assembly of virtual reality glasses and an external electronic device according to an aspect of the disclosure.

FIG. 1 is a diagram illustrating an assembly of virtual reality glasses and an external electronic device according to an aspect of the disclosure. As shown in FIG. 1, virtual reality glasses 100 include an eyeglass body 1 and a data connection cable 2. The eyeglass body 1 may be configured to be assembled with an external electronic device 200 that plays the virtual reality content, such that when the user wears the virtual reality glasses 100, the user may see the virtual reality content played by the external electronic device 200.

Figure 2:
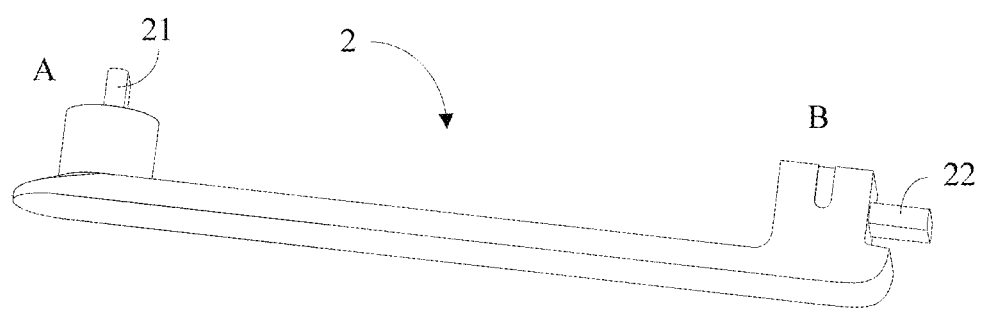
FIG. 2 is a schematic structural diagram of a data connection cable according to an aspect of the disclosure.
Figure 3:
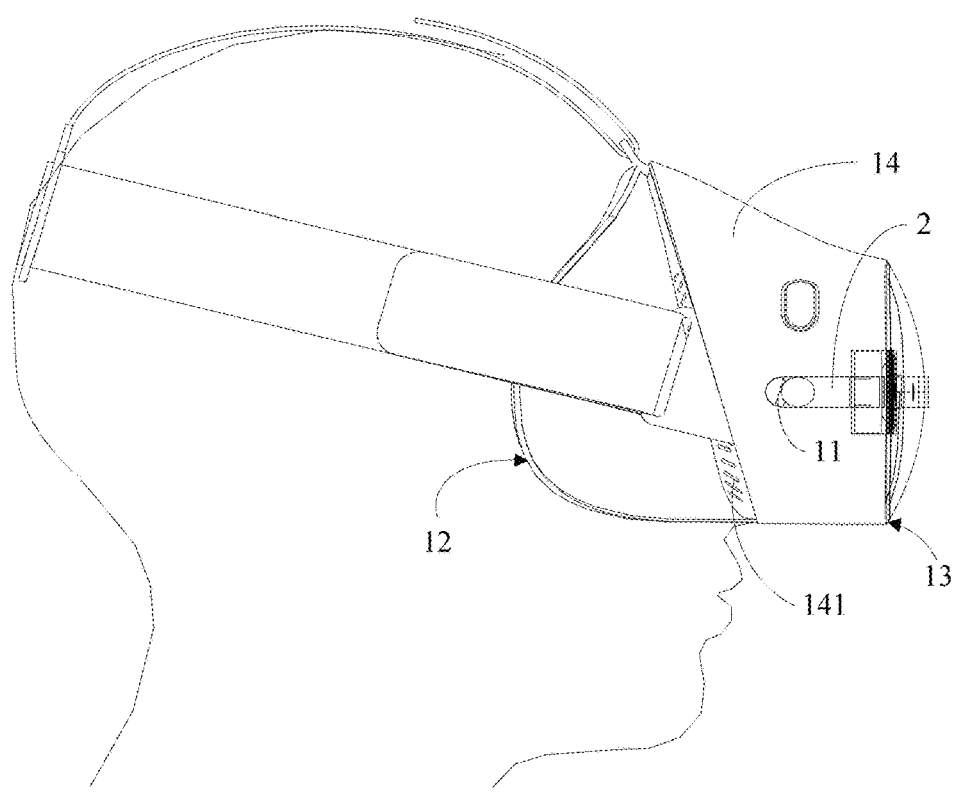
FIG. 3 is a schematic diagram of wearing virtual reality glasses according to an aspect of the disclosure.
Figure 4:
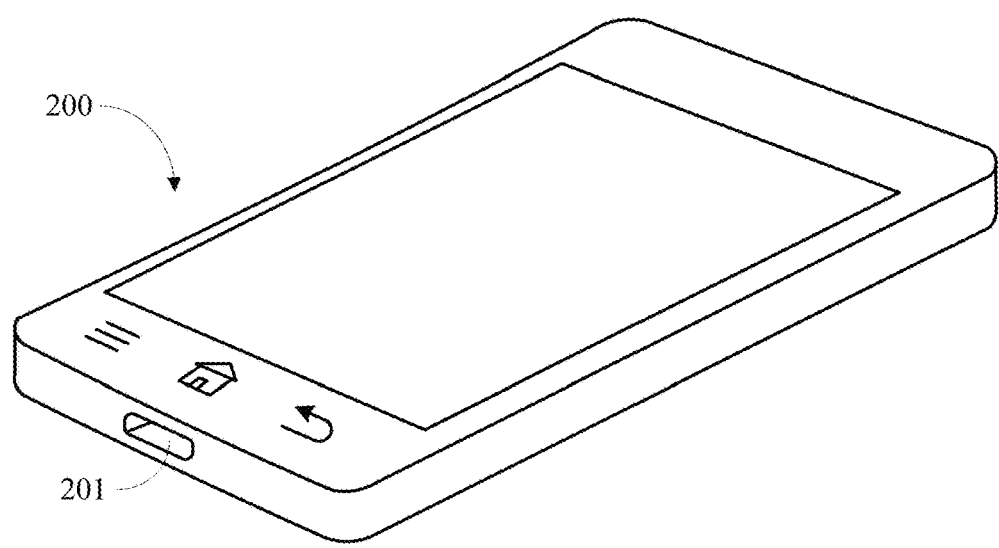
FIG. 4 is a schematic diagram of an electronic device according to an aspect of the disclosure.

As shown in FIG. 2, the data connection cable 2 may include a first connecting plug 21 at a first end A and a second connecting plug 22 at a second end B. The first connecting plug 21 may be fitted to a first interface 11 on the eyeglass body 1 as shown in FIG. 3, such that the data connection cable 2 is detachably connected to the eyeglass body 1. The second connecting plug 22 may be fitted to a second interface 201 of the external electronic device 200 shown in FIG. 4, such that a signal communication between the virtual reality glasses 100 and the external electronic device 200 may be established through the data connection cable 2. Therefore, the data connection cable 2 according to the embodiment may be quickly detached and removed from the eyeglass body 1. The user may select a data connection cable 2 of a corresponding type for the virtual reality glasses 1 according to the specifications of the second interface 201, such that the eyeglass body 1 may be fitted to external electronic devices 200 with different interfaces, improving the versatility of the virtual reality glasses 100. For example, when the specification of the second interface 201 is a USB Type-C interface, the second connecting plug 2 may be a connection cable with the second connecting plug 2 being a USB Type-C plug. For another example, when the specification of the second interface 201 is a Lighting interface, the second connecting plug 2 may be selected as a data connection cable 2 with a Lighting plug.

In an example shown in FIG. 3, the eyeglass body 1 may include a housing 14. A surface of the housing 14 facing the user's face is a first surface 12, and a surface of the housing 14 configured to assemble the external electronic device 200 is a second surface 13. The first interface 11 may be disposed at a side wall of the housing 14, to facilitate the user to insert or detach the data connection cable 2 to or from the eyeglass body 1.

For example, depending on the operation preference of most users, the first interface 11 may be disposed on the right side of the outer surface of the housing 14 such that the user may easily insert or remove the data connection cable 2 with the dominant right hand, while the user is wearing the virtual reality glasses 100. Also, the first interface 11 may be disposed at any position of the left side of the outer surface of the housing 14, at the left side of the inner surface of the housing 14, at the right side of the inner surface of the housing 14 or other position.

In the technical solution of the present disclosure, the specific structure of the data connection cable 2 used by the virtual reality glasses 100 is not limited. In fact, the data connection cable 2 of any structure may be applied to the virtual reality glasses 100 for adaptation to the eyeglass body 1.

Figure 5A:
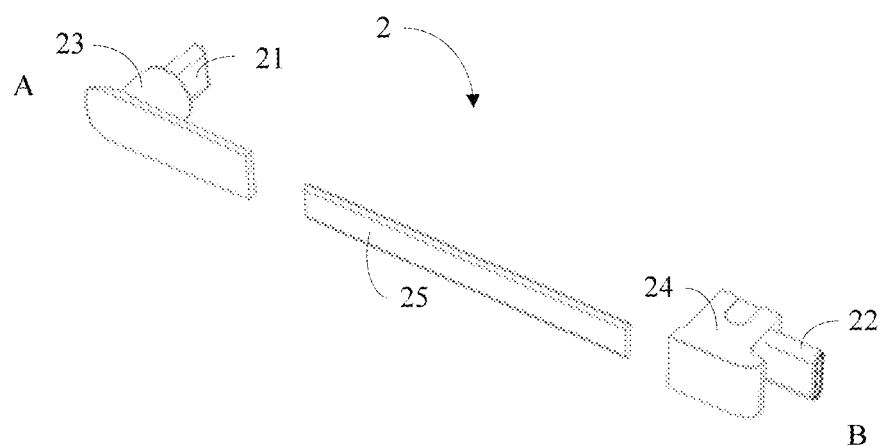
FIG. 5A is an exploded schematic diagram of a data connection cable according to an aspect of the disclosure.

As shown in FIG. 5A, the data connection cable 2 may include a first connecting portion 23 at the first end A, a second connecting portion 24 at the second end B, and a data cable body 25 between the first end A and the second end B. The first connecting portion 23, the second connecting portion 24 and the data cable body 25 are electrically connected to one another through wires or other physical connections. The first connecting portion 23 may be a first connection housing structure that fixes the first connecting plug 21 at the end portion thereof. The second connecting portion 24 may be a second connection housing structure that fixes the second connecting plug 22 at the end portion thereof. Thus, the first connecting plug 21 and the second connecting plug 22 are secured with the data connection cable 2 respectively by the first connecting portion 23 and the second connecting portion 24.

For example, the data cable body 25 may include at least one or more flexible material. The data cable body 25 may be made of a flexible material, or the data connection cable 2 may be made of a flexible material as a whole, such that the data connection cable 2 may be adaptively deformed when a separation distance between the first interface 11 and the second interface 201 varies depending on the external dimension of the external electronic device 200. As shown in FIG. 1, when the external dimension of the external electronic device 200 is relatively large, the separation distance between the first interface 11 and the second interface 201 is relatively small, and the data connection cable 2 may be bent to adapt to the separation distance.

Figure 5B:
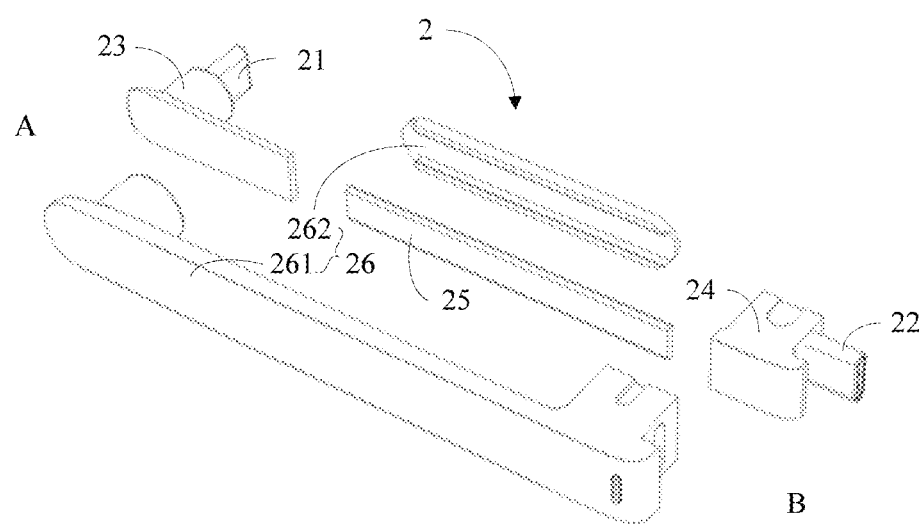
FIG. 5B is an exploded schematic diagram of another data connection cable according to an aspect of the disclosure.
Figure 5C:
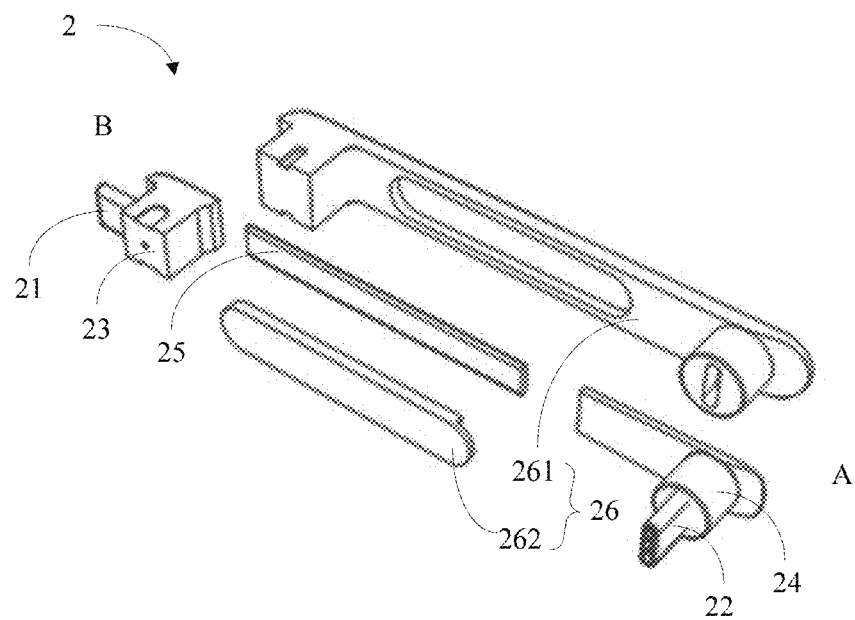
FIG. 5C is an exploded schematic diagram of another data connection cable according to an aspect of the disclosure.
Figure 5D:
FIG. 5D is a side view of a data connection cable according to an aspect of the disclosure.
Figure 5E:
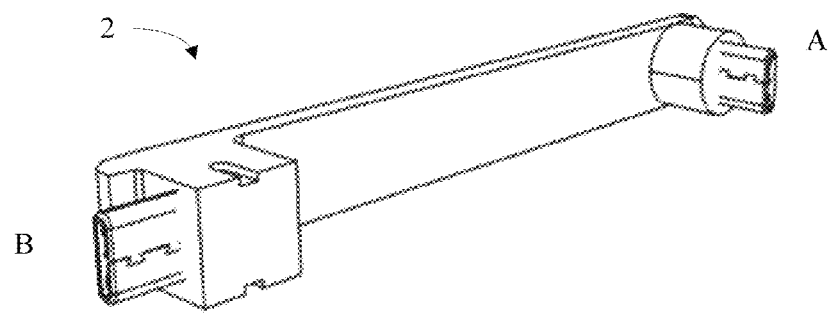
FIG. 5E is an oblique side view of a data connection cable according to an aspect of the disclosure.
Figure 5F:
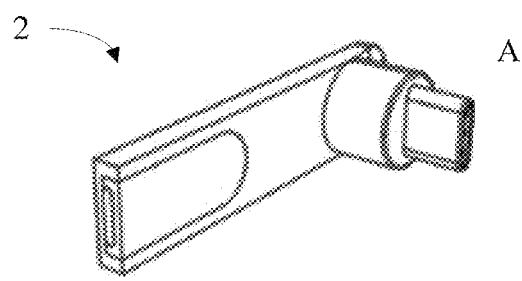
FIG. 5F is a cross sectional view of a data connection cable according to an aspect of the disclosure.

As shown in FIG. 5B and FIG. 5C, the data connection cable 2 may be injection-molded to form an injection molded structure 26 enclosing the first connecting portion 23, the second connecting portion 24 and the data cable body 25. Thus, it may protect the internal circuit of the data connection cable 2 to reduce the probability of damage, on one hand, and on the other hand, it may realize adaptive assembly with other structures (this will be described in detail later, and is omitted here). In an example, the injection molded structure 26 may be injection-molded at one time, or may be injection-molded at multiple times. After being injection-molded, a front view of the data connection cable 2 is shown in FIG. 5D. FIG. 5E shows an oblique side view of the data connection cable 2. FIG. 5F shows a cross sectional view of the data connection cable 2. The present disclosure does not limit the manner of injection molding. Examples of the manner of injection molding may be as follows.

In one example, the first connecting portion 23, the second connecting portion 24 and the data cable body 25 may be placed in an injection mold so as to form the injection molded structure 26 enclosing the first connecting portion 23, the second connecting portion 24 and the data cable body 25 from outside thereof.

In another example, the first connecting portion 23, the second connecting portion 24 and the data cable body 25 may be placed in a first mold, to form a first injection molded structure 261 enclosing part of the first connecting portion 23, the second connecting portion 24 and the data cable body 25. Then, a second injection molded structure 262 fitted to the first injection molded structure 261 may be formed by injection with a separate second mold. After that, the first injection molded structure 261 and the second injection molded structure 262 are assembled to form the injection molded structure 26.

In yet another example, the first connecting portion 23, the second connecting portion 24 and the data cable body 25 may be placed in a first mold for injection, to form a first injection molded structure 261. Then, the first injection molded structure 261 as a whole is placed in a second mold for injection, to obtain a second injection molded structure 262, which is directly formed into the injection molded structure 26.

Figure 6:
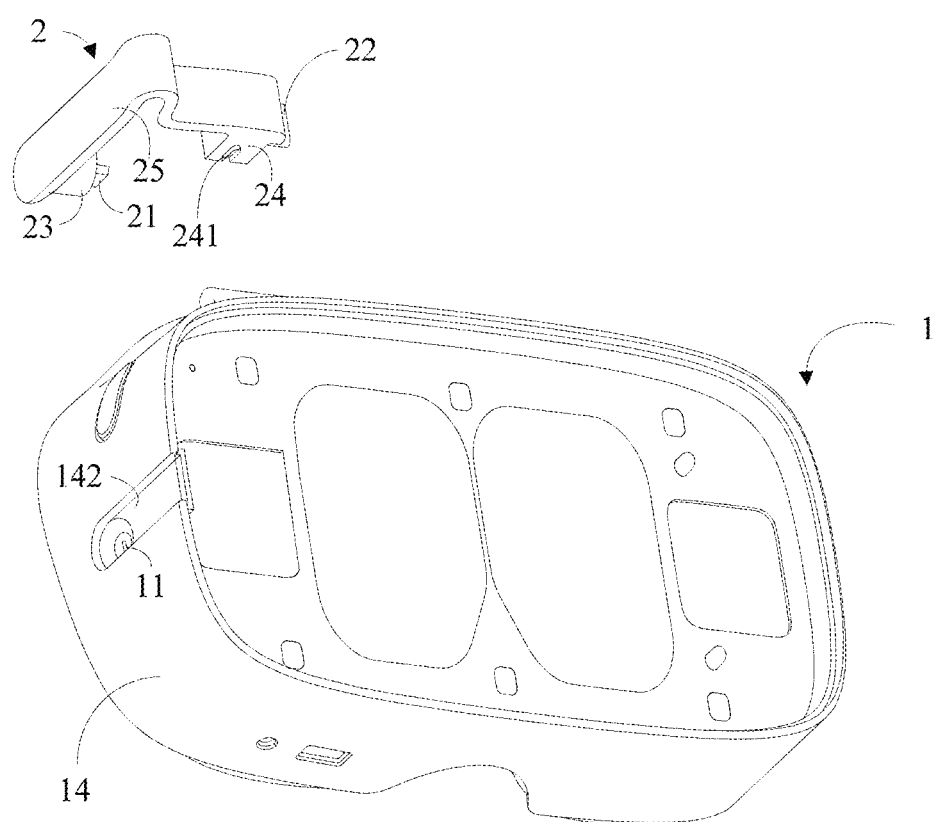
FIG. 6 is a partially exploded schematic diagram of virtual reality glasses according to an aspect of the disclosure.

When the first interface 11 is disposed on the right side of the outer surface of the housing 14, as shown in FIG. 6, a first groove 142 may be formed on the surface of the housing 14 of the eyeglass body 1. The data connection cable 2 may be fitted to the first groove 142 through the injection molded structure 26 formed in the above example, such that the first groove 142 may receive the first connecting portion 23 and at least a part of the data cable body 25. Thus, it may achieve the accommodation and limitation of the data connection cable 2 and avoid the scattering of the data connection cable 2. The first interface 11 may be located inside the first groove 142. For example, the first interface 11 is located on the side of the first groove 142 facing the inner side of the housing 14. And the interface specification of the first interface 11 is fitted to the specification of the first connecting plug 21 of the data connection cable 2.

Further, after the data connection cable 2 is assembled to the eyeglass body 1, the surfaces of the first connecting portion 23 and at least a part of the data cable body 25 may be flush with the surface of the housing 14 of the eyeglass body 1 (as shown in FIG. 1). This may improve the integrity between the data connection cable 2 and the eyeglass body 1, and improve the aesthetics of the virtual reality glasses 100.

In the technical solution of the present disclosure, depending on the structure of the first groove 142 and the arrangement of the first interface 11 in the first groove 142, the first connecting plug 21 may fitted to the first interface 11 through a plurality of manners.

As shown in FIG. 6, the first groove 142 may be formed by recessing the outer surface of the housing 14 toward the inner side of the housing 14. The depth of the first groove 142 may be adjusted to the thickness of the data cable body 25 of the data connection cable 2. The width of the first groove 142 may be fitted to the width of the data cable body 25 of the data connection cable 2. In addition, the shape of the inner sidewall of the first groove 142 may also be fitted to the shape of the end of the data cable body 25 of the data connection cable 2. The first interface 11 may be located at a bottom of the first groove 142 in the depth direction such that the first connecting plug 21 may be plugged to the first interface 11 in a direction perpendicular to the outer surface of the housing 14, so as to be connected to the eyeglass body 1. In some examples, the surface of the first groove 142 may also be inclined such that the first connecting plug 21 may be inserted into the first interface 11 obliquely, rather than perpendicular to the outer surface of the housing 14. The present disclosure does not limit the angular relationship between the first connecting plug 23 and the outer surface of the housing 14. Correspondingly, in order to adapt to the first groove 142 and the first interface 11, the first connecting plug 21 may be perpendicular to the connecting direction of the first end A and the second end B (the data connection cable 2 shown in FIG. 6, consistent with the examples shown in FIGS. 2 and 5A-5F), such that the first connecting plug 21 may be perpendicular to the housing 14 and be plugged to the first interface 11 when the data cable body 25 is parallel to the housing 14. This may facilitate implementing the above mentioned "such that the first groove 142 may receive the first connecting portion 23 and at least a part of the data cable body 25" as much as possible.

Figure 7:
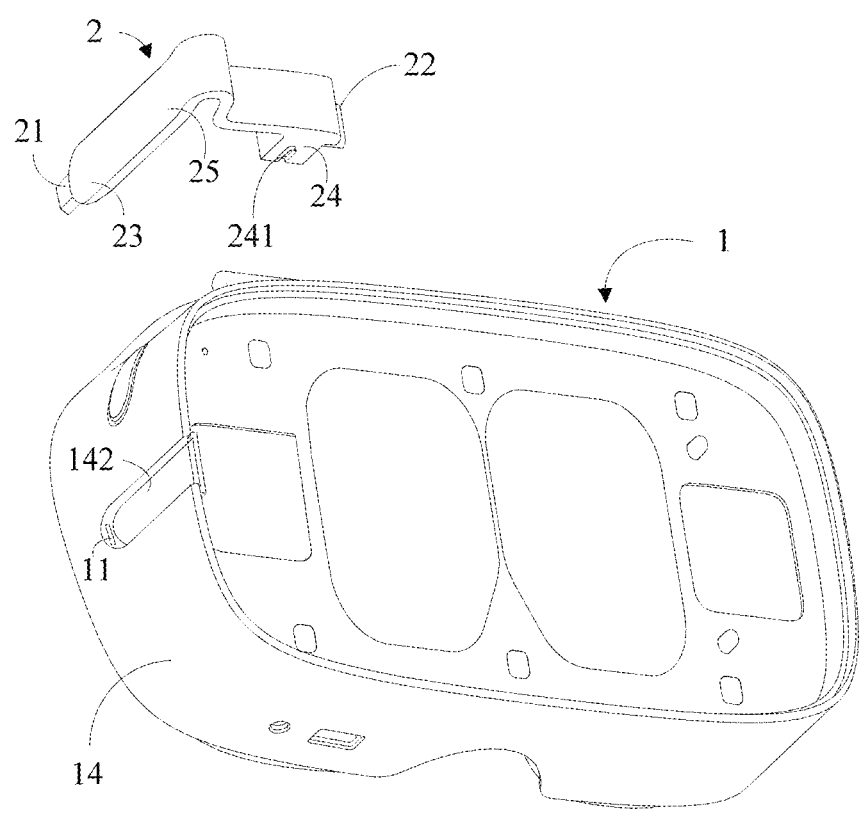
FIG. 7 is a partially exploded schematic diagram of another virtual reality glasses according to an aspect of the disclosure.

In another example, as shown in FIG. 7, the first groove 142 may be formed by recessing the outer surface of the housing 14 toward the inner side of the housing 14. The depth of the first groove 142 may be fitted to the thickness of the data cable body 25 of the data connection cable 2. The width of the first groove 142 may be fitted to the width of the data cable body 25 of the data connection cable 2. In addition, the shape of the inner sidewall of the first groove 142 may also be fitted to the shape of the end of the data cable body 25 of the data connection cable 2. The first interface 11 may be located on the sidewall of the first groove 142 such that the first connecting plug 23 may be plugged to the first interface 11 in a direction parallel to the surface of the housing 14, so as to be connected to the eyeglass body 1. In some examples, the surface of the first groove 142 may also be inclined, such that the first connecting plug 23 may be inserted into the first port 11 obliquely, rather than in parallel to the outer surface of the housing 14.

The present disclosure does not limit the angular relationship between the first connecting plug 23 and the outer surface of the housing 14. Correspondingly, in order to adapt to the first groove 142 and the first interface 11, in the data connection cable 2 shown in FIG. 8, the first connecting plug 21 may be parallel to the connection direction of the first end A and the second end B, such that the first connecting plug 21 may be plugged to the first connection 11 in a direction parallel to the housing 14 when the data cable body 25 is parallel to the housing 14. This may facilitate implementing the above mentioned "such that the first groove 142 may receive the first connecting portion 23 and at least a part of the data cable body 25" as much as possible.

Additionally or alternatively, the first interface 11 may also be located at other positions of the first groove 142, and the position and structure of the first connecting plug 21 on the data connection cable 2 may also be adaptively changed, such that when the first connecting plug 21 is assembled to the first connector 11, it may facilitate implementing the above mentioned "such that the first groove 142 may receive the first connecting portion 23 and at least a part of the data cable body 25" as much as possible.

It should be noted that although the first interface 11 is located on the right side of the outer surface of the housing 14 as an example in the above descriptions, those skilled in the art should understand that when the first interface 11 is disposed on the left side of the outer surface of the housing 14, on the right side of the inner surface of the housing 14, on the left side of the inner surface of the housing 14, or at other position, the configuration as shown in FIG. 6 or 7 may also apply, which will not be repeated herein one by one.

For ease of understanding, the data connection cables 2 in the examples shown in FIG. 2, FIG. 5A to FIG. 5F and FIG. 6 are taken as an example for description of the following examples.

The assembly between the second connecting plug 22 of the data connection cable 2 and the second interface 201 of the external electronic device 200 may be achieved by detachably securing the second connecting portion 24 of the data connection cable 2 to the corresponding structure of the eyeglass body 1, to prevent the second connecting portion 24 from swaying to cause the connection between the second connecting plug 22 and the second interface 201 to be unstable.

Figure 8:
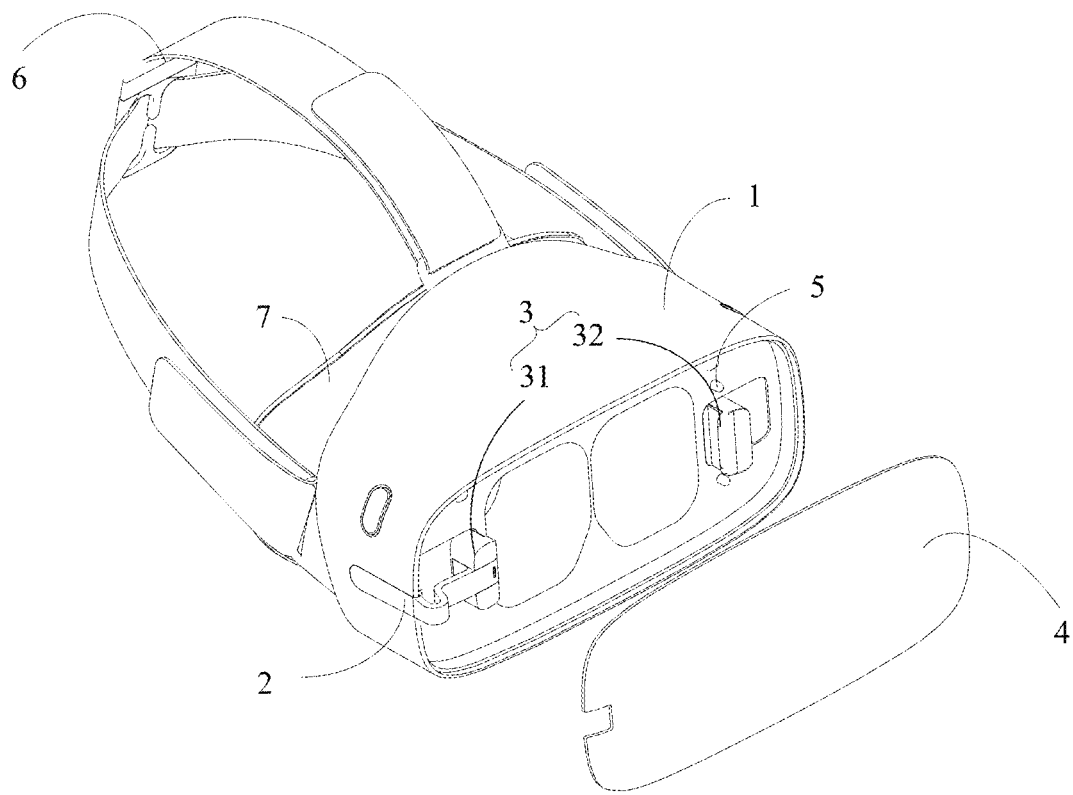
FIG. 8 is an exploded schematic diagram of another virtual reality glasses according to an aspect of the disclosure.

In an aspect of the disclosure, the virtual reality glasses 100 may include a fastening structure 3 as shown in FIG. 8. The fastening structure 3 includes a first fastening portion 31 and a second fastening portion 32. The first fastening portion 31 and the second fastening portion 32 may fasten the external electronic device 200 from two sides. The fastened structure may refer to FIG. 1. Details about the fastening structure 3 will be described in detail in the subsequent descriptions and not repeated herein. Then, the second connecting portion 24 of the data connection cable 2 may be fitted to the first fastening portion 31 or the second fastening portion 32, to realize the detachable securing of the eyeglass body 1.

Figure 9:
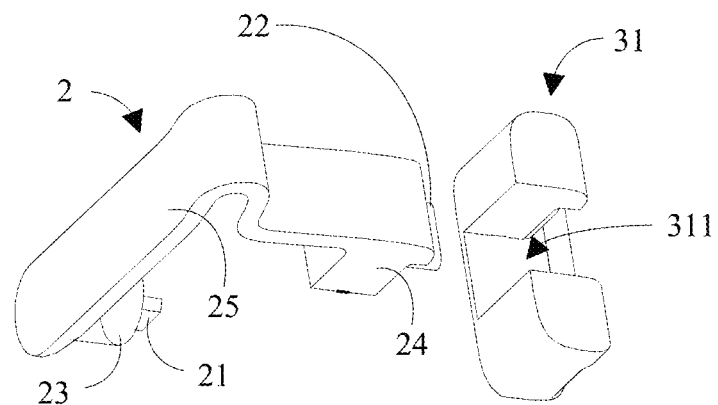
FIG. 9 is a schematic diagram of installation of a data connection cable and a first fastening portion according to an aspect of the disclosure.

For example, as shown in FIG. 9, since the first fastening portion 31 is closer to the data connection cable 2 than the second fastening portion 32, the second connecting portion 24 of the data connection cable 2 may be detachably connected to the first fastening portion 31, such that the data connection cable may be detachably secured to the eyeglass body 1. A receiving space 311 may be formed on the first fastening portion 31, and the receiving space 311 may be used for accommodating the second connecting portion 24 of the data connection cable 2 and the second connecting plug 22 connected to the second connecting portion 24 may protrude from the first fastening portion 31 and face towards the corresponding end surface of the external electronic device 200, so as to be assembled with the second interface 201.

In an example shown in FIG. 9, when the second connecting portion 24 is made of a flexible material, the width dimension of the receiving space 311 may be slightly smaller than the width dimension of the second connecting portion 24. Then, the second connecting portion 24 and the first fastening portion 31 may be detachably connected by the interference fit of the second connecting portion 24 and the receiving space 311.

Figure 10:
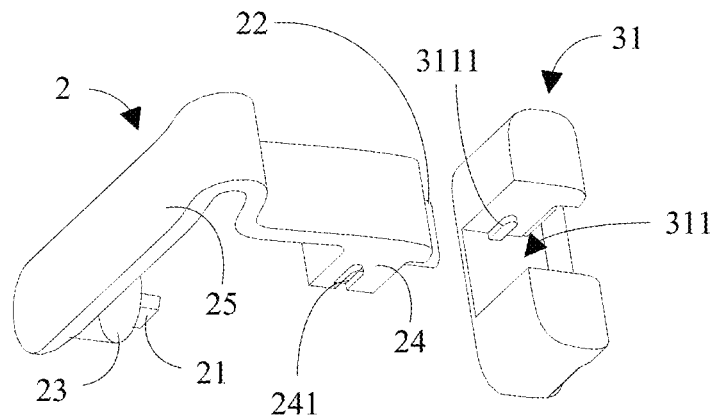
FIG. 10 is a schematic diagram of installation of another data connection cable and a first fastening portion according to an aspect of the disclosure.

In another example, as shown in FIG. 10, a protruding block 3111 may be formed on the sidewall defining the receiving space 311. Correspondingly, a second groove 241 fitted to the protruding block 3111 may be formed on the second connecting portion 24. When the second connecting portion 24 is assembled to the first fastening portion 31, the protruding block 3111 and the second groove 241 may be engaged to each other, so as to secure and limit the second connecting portion 24, and achieve connection between the second connecting portion 24 and the first fastening portion 31. When an external force is applied on the second connecting portion 24 and releases the engagement between the protruding block 3111 and the second groove 241 in the opposite direction, the second connecting portion 24 may be separated from the first fastening portion 31.

In the above examples, the receiving space 311 may be formed by recessing the surface of the first fastening portion 31 far away from the eyeglass body 1 in a direction toward the interior of the eyeglass body 1. Then, the second connecting portion 24 of the data connection cable 2 may be fastened and assembled in a direction toward the eyeglass body 1, which is convenient for operation.

Further, the virtual reality glasses 100 may also include a cover plate 4 as shown in FIG. 8. The cover plate 4 may be detachably connected to the eyeglass body 1 to cover and protect the external electronic device 200 assembled to the eyeglass body 1. A side (i.e., an inner surface of the cover 4) of the cover 4 close to the eyeglass body 1 may abut against a surface (i.e., the outer surface of second connecting portion 24 facing the cover plate 4) of the second connecting portion 24 of the data connection cable 2 assembled to the receiving space 311, so as to limit the data connection cable 2 in the direction assembling the cover 4 to limit the movement of the second connecting portion 24 relative to the first fastening portion 31. It may avoid fall off of the second connecting portion 24 of the data connection cable 2.

For ease of understanding, the engagement between the fastening structure 3 and the external electronic device 200 will be described below.

Figure 11:
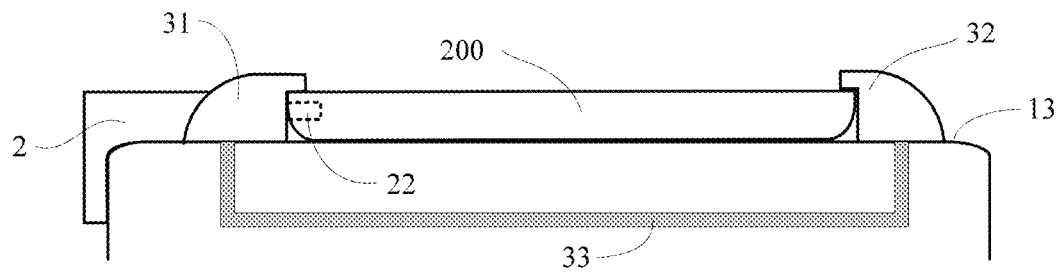
FIG. 11 is a schematic diagram illustrating a fastening structure fastening an external electronic device according to an aspect of the disclosure.

For example, as shown in FIG. 11, one end of the external electronic device 200 having the second interface 201 may be fastened by the first fastening portion 31 of the fastening structure 3, and the opposite end of the external electronic device 200 may be fastened by the second fastening portion 32. The distance between the first fastening portion 31 and the first end A of the data connection cable 2 is smaller than the distance between the second fastening portion 32 and the first end A of the data connection cable 2, such that it may ensure that the second connecting plug 22 of the data connection cable 2 is plugged to the second interface 201 of the external electronic device 200, while it may shorten the length of the data connection cable 2 as much as possible to prevent the data connection cable 2 from being scattered inside or outside the virtual reality glasses 100.

Figure 12:
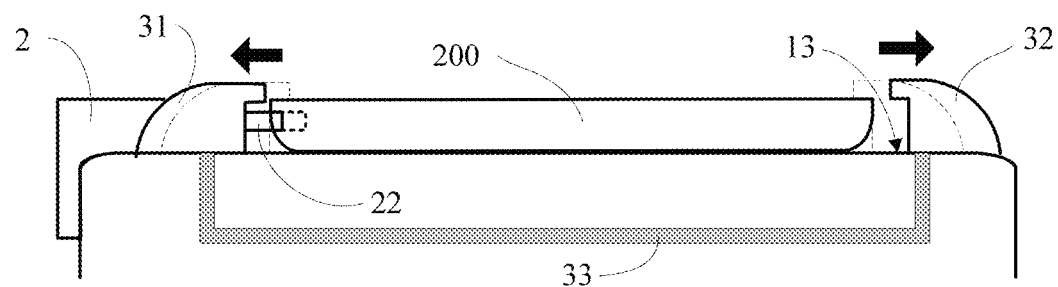
FIG. 12 is a schematic diagram illustrating a fastening structure releasing fastening of an external electronic device according to an aspect of the disclosure.

The fastening structure 3 may also include a transmission part 33. Two ends of the transmission part 33 may be respectively fitted to the first fastening portion 31 and the second fastening portion 32. As shown in FIG. 12, when any one of the first fastening portion 31 and the second fastening portion 32 moves in a preset direction, the transmission part 33 may drive the other one of the first fastening portion 31 and the second fastening portion 32 to move in linkage in a direction opposite to the preset direction. On one hand, it may be applied to different specifications of electronic devices, and it may facilitate the plug and disengagement between the second connecting plug 22 of the data connection cable 2 and the second interface 201 of the external electronic device 200, and in turn, realizing the detach and disengagement between the external electronic device 200 and the virtual reality glasses 100.

Figure 13:
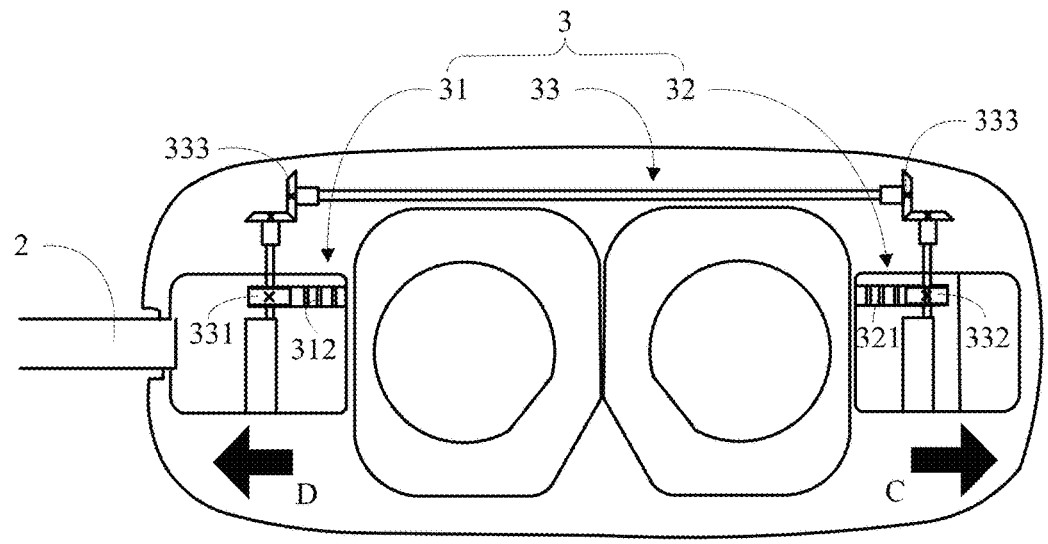
FIG. 13 is a view of virtual reality glasses from a first view angle according to an aspect of the disclosure.

In an example, as shown in FIG. 13, the first fastening portion 31 and the second fastening portion 32 may respectively include a fourth transmission member 312 and a fifth transmission member 321. The fourth transmission member 312 and the fifth transmission 321 are respectively fitted to a first transmission member 331 and a second transmission member 332 at the two ends of the transmission part 33. Thus, when an external force is applied to the second fastening portion 32 and causes the second fastening portion 32 to move in a direction of the arrow C shown in the figure, the fifth transmission member 321 may drive the second transmission member 332 to rotate and further drive the first transmission member 331 to rotates in the opposite direction, such that the fourth transmission member 312 moves in a direction of the arrow D shown in the figure. Thus, the first fastening portion 31 and the second fastening portion 32 may be separated from each other. When the second fastening portion 32 moves in the direction opposite to the direction indicated shown by the arrow C, the first fastening portion 31 and the second fastening portion 32 may be brought close to each other. When an external force is applied to the first fastening portion 31 and causes the first fastening portion 31 to move, the second fastening portion 32 may also move in linkage, the detail of which will not be repeated herein.

The fourth transmission member 312 and the fifth transmission member 321 may be racks respectively secured to the first fastening portion 31 and the second fastening portion 32. The first transmission member 331 and the second transmission member 332 may be gears respectively fitted to the racks. Various structural relationships may be adopted between the first fastening portion 31 or the second fastening portion 32 according to the form of the racks. Taking the rack fitted to the first fastening portion 31 as an example, the rack may be formed independently of the first fastening portion 31 so as to be secured to the first fastening portion 31 by means of bolts, welding, adhesion, or the like. Alternatively, the rack may be directly produced and formed on the first fastening portion 31. The fourth transmission member 312 and the fifth transmission member 321 may adopt any of the above-described structural relationships, and the corresponding structural relationships between the fourth transmission member 312 and the fifth transmission member 321 may be the same or different, which is not limited in the present disclosure.

In this example, the transmission part 33 may also include a third transmission member 333 fitted to the first transmission member 331 and the second transmission member 332. The third transmission member 333 may enable the first transmission member 331 and the second transmission member 332 to move in linkage, and may further enable the first fastening portion 31 and the second fastening portion 32 to move in linkage.

Figure 14:
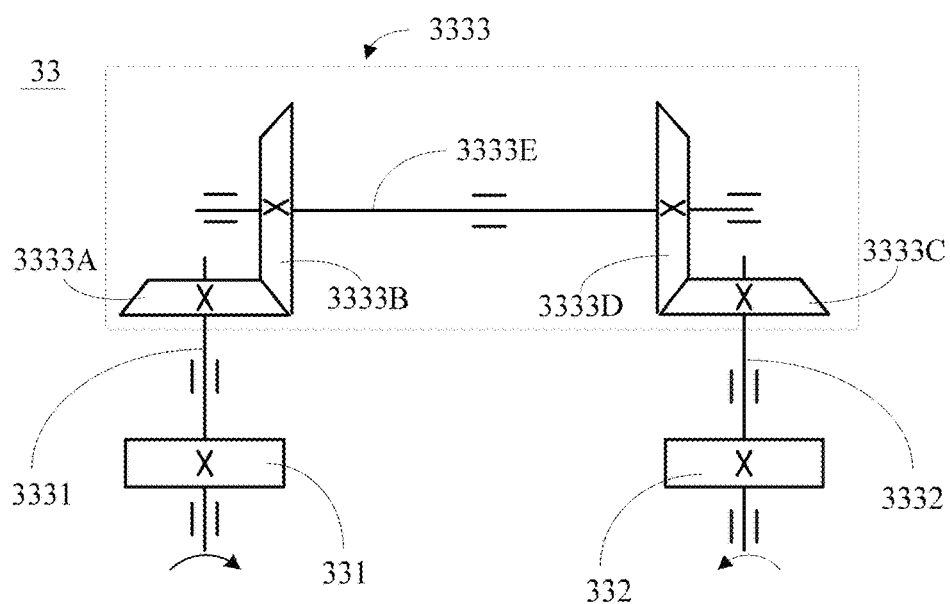
FIG. 14 is a brief diagram illustrating transmission of a driving portion of virtual reality glasses according to an aspect of the disclosure.

For example, as shown in FIG. 14, the third transmission member 333 may include a first transmission shaft 3331 and a second transmission shaft 3332 respectively fitted to the first transmission member 331 and the second transmission member 332, and an adaption element 3333 fitted to the first transmission shaft 3331 and the second transmission shaft 3332. The first transmission shaft 3331 and the second transmission shaft 3332 rotate in opposite directions, to respectively drive the fourth transmission member 312 and the fifth transmission member 321 to move in different directions, such that the first fastening portion 31 and the second fastening portion 32 move in opposite directions.

In an example, as shown within the dashed box in FIG. 14, the adaption element 3333 may include a first bevel gear set composed of a first bevel gear 3333A and a second bevel gear 3333B, a second bevel gear set composed of a third bevel gear 3333C and a fourth bevel gear 3333D, and a rotation shaft 3333E connected between the second bevel gear 3333B and the fourth bevel gear 3333D, such that by the cooperation between the first bevel gear set and the second bevel gear set, the direction of the movement may be changed while the movement is being transmitted, so as to realize the translational linkage between the first fastening portion 31 and the second fastening portion 32. However, in other examples, the adaption element 3333 may also include three or more pairs of bevel gear sets and the adaptive rotation shaft, which is not limited in the present disclosure.

In another example, the adaption element 3333 may include two motors cooperating with the first transmission shaft 3331 and the second transmission shaft 3332, respectively. Then, when detecting that one of the motors is in the working state, the virtual reality glasses 100 may switch the other motor to the activated state to respectively drive the first fastening portion 31 and the second fastening portion 32 to move at the same time. The first transmission shaft 3331 and the second transmission shaft 3332 may be power output shafts corresponding to the motors respectively. Alternatively, the motor may be separately coupled to the first transmission shaft 3331 or the second transmission shaft 3332 through another transmission structure, which is not limited in the present disclosure.

Figure 15:
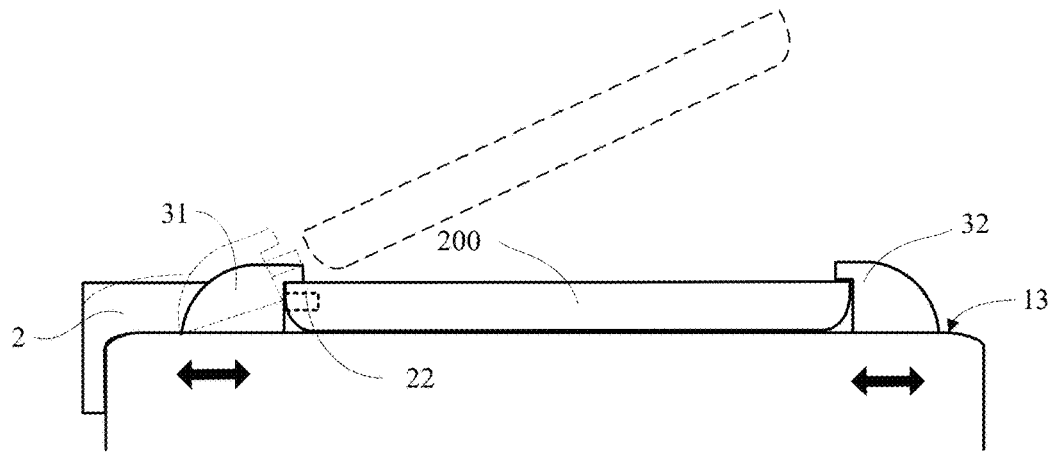
FIG. 15 is a schematic diagram illustrating a fastening structure fastening an external electronic device according to an aspect of the disclosure.

In the example of the present disclosure, the angle of the second connecting plug 22 may be adjusted to facilitate the assembly of the external electronic device 200. As shown in FIG. 15, when the external electronic device 200 is finally assembled to the second surface 13, the interface on the external electronic device 200 and the second connecting plug 22 are at a horizontal fastening angle. If the angle of the second connecting plug 22 is not adjustable, the second connecting plug 22 is always maintained at the horizontal fastening angle. When the user plugs the interface of the external electronic device 200 into the second connecting plug 22, the external electronic device 200 may only be plugged with the second connecting plug 22 with the second surface 13 maintained at the predetermined angle due to the obstruction of the second fastening portion 32. In other words, the external electronic device 200 inevitably has an included angle with the second connecting plug 22, resulting in difficulty in plug engagement between the external electronic device 200 between the second connecting plug 22, and even causing the second connecting plug 22 to break during the plug engagement.

Therefore, when the second connecting portion 24 of the data connection cable 2 is detachably connected with the first fastening portion 31, the present disclosure may improve the structure of the first fastening portion 31, to make the second connecting plug 22 to realize a preset tilt opening angle (indicated by a dotted line in FIG. 15), such that when the second connecting plug 22 rotates to be parallel to the external electronic device 200, it may ensure that the second connecting plug 22 is in parallel to the interface on the external electronic device 200. Thus, the plug engagement may be easily performed, and it may effectively avoid the breakage of the second connecting plug 22.

Figure 16A:
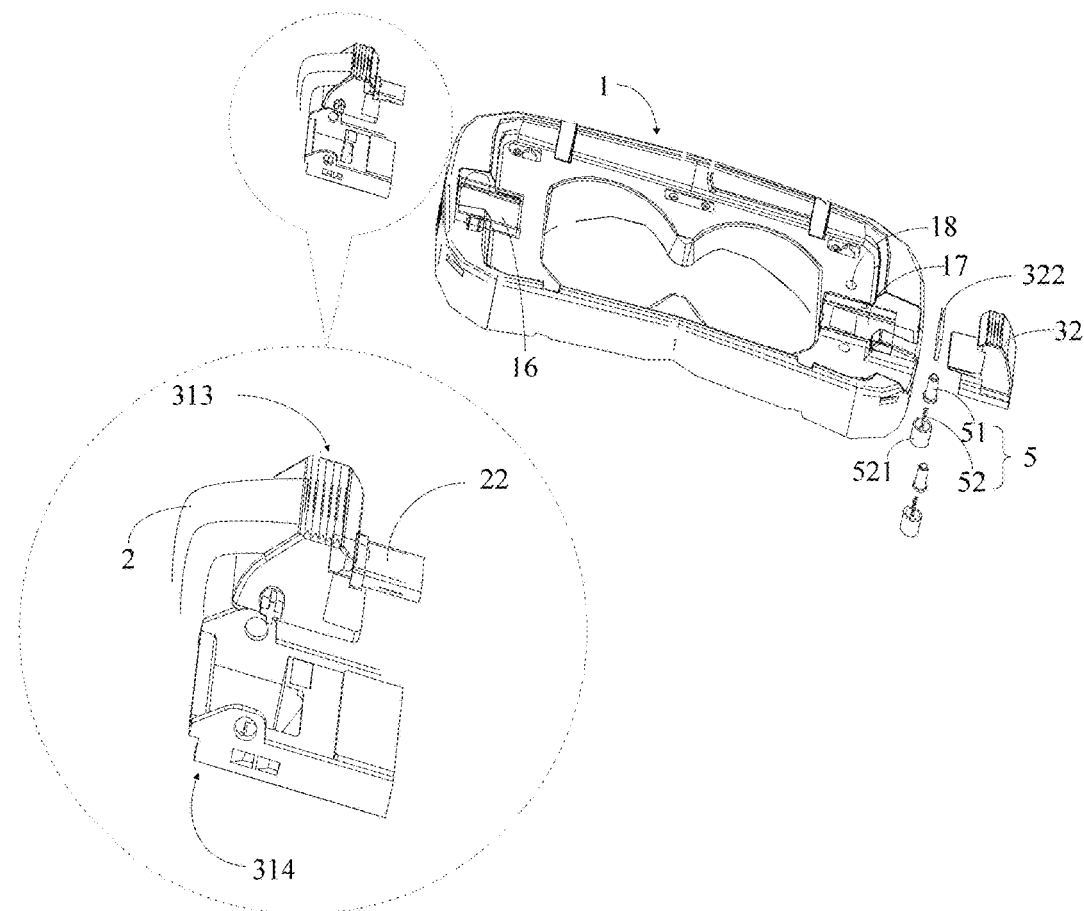
FIG. 16A is a partial exploded diagram of virtual reality glasses according to an aspect of the disclosure.
Figure 16B:
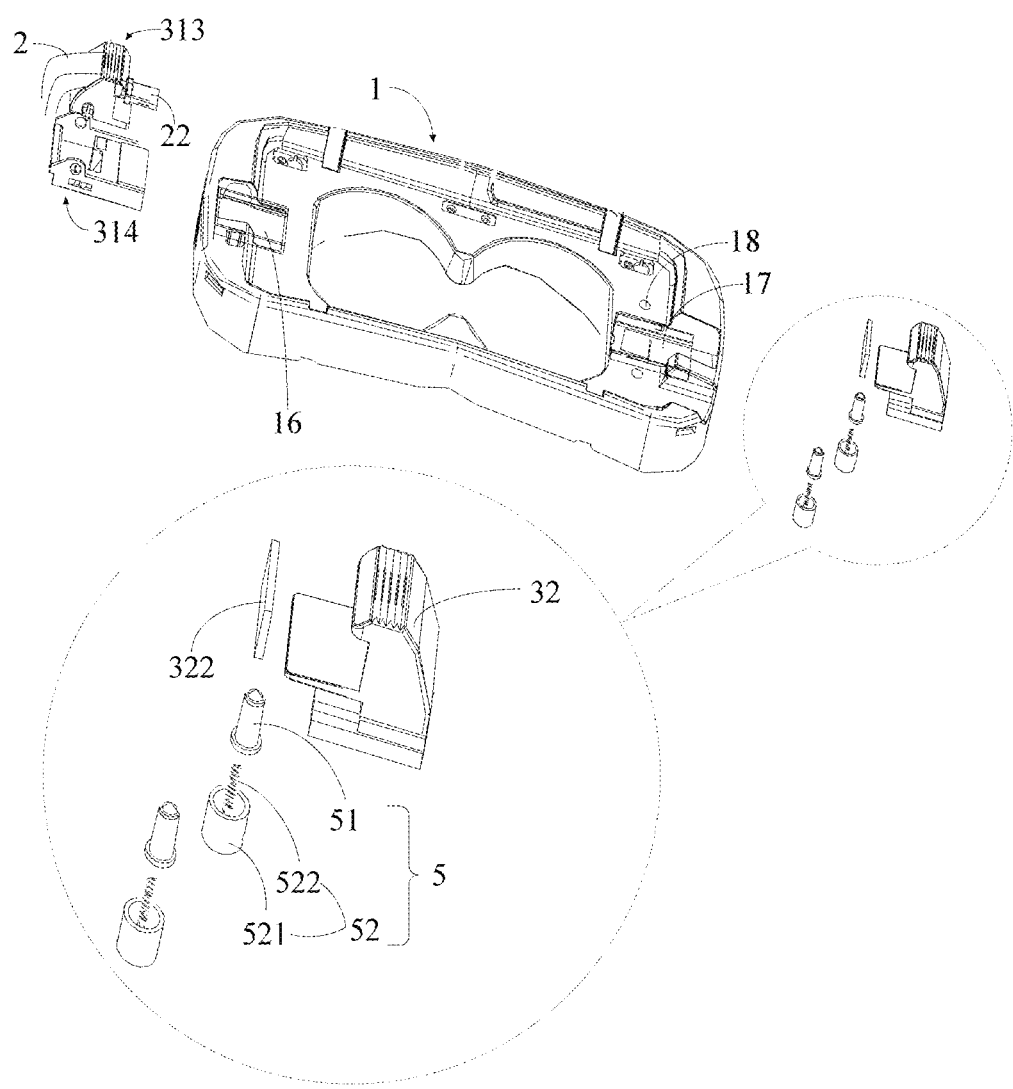
FIG. 16B is a partial exploded diagram of virtual reality glasses according to an aspect of the disclosure.

FIG. 16A is a partial exploded diagram of virtual reality glasses according to an aspect of the disclosure. FIG. 16B is a partial exploded diagram of virtual reality glasses according to an aspect of the disclosure. As shown in FIG. 16A and FIG. 16B, the first fastening portion 31 may include a first fastening seat 313 and a first movable plate 314 that are hinged to each other, such that the first fastening seat 313 may rotate relative to the first movable plate 314 between the preset maximum tilt opening angle and a horizontal fastening angle. Then, it may further bring the second connecting plug 22 to rotate between the preset maximum tilt opening angle and the horizontal fastening angle, to facilitate the assembly between the data connection cable 2 and the external electronic device 200. The first fastening seat 313 may fasten one end of the external electronic device 200 having the second interface 201 at the horizontal fastening angle.

In this example, the first movable plate 314 may slide relative to a first guide rail 16 on the eyeglass body 1 to drive the first fastening seat 313 to reciprocate relative to the eyeglass body 1. Then, when the first fastening portion 31 and the second fastening portion 32 engaged by means of the transmission portion 33 in the manner shown in any one of the examples shown in FIGS. 11-13, and the second fastening portion 32 may reciprocate relative to a second guide rail 17, the second connecting plug 22 may be made to have two degrees of freedom in horizontal movement and in rotation relative to the horizontal direction, further facilitating the assembly and separation of the external electronic device 200.

For example, a fourth transmission member 312 fitted to the transmission part 33 may be disposed on a side of the first movable plate 314 facing the transmission part 33, and a hole may be formed at a corresponding position of the first guide rail 16, such that the fourth transmission member 312 may be fitted to the first transmission member 331 on the transmission part 33 through the hole. Similarly, the fifth transmission member 321 fitted to the transmission part 33 may be disposed on the second fastening portion 32 toward a side of the transmission part 33, and a hole is formed at a corresponding position of the second guide rail 17, such that the fifth transmission member 321 may be fitted to the second transmission member 332 of the transmission portion 33 through the hole.

Figure 16C:
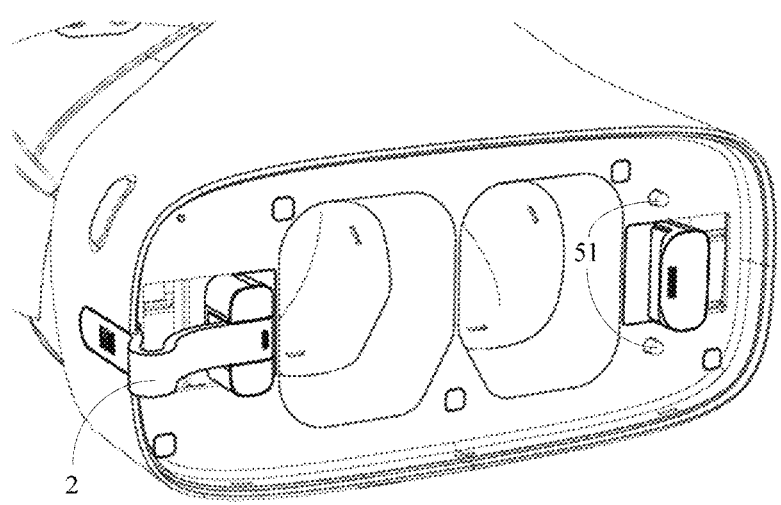
FIG. 16C is a schematic diagram illustrating a support member 51 when the external electronic device is not assembled according to an aspect of the disclosure.
Figure 16D:
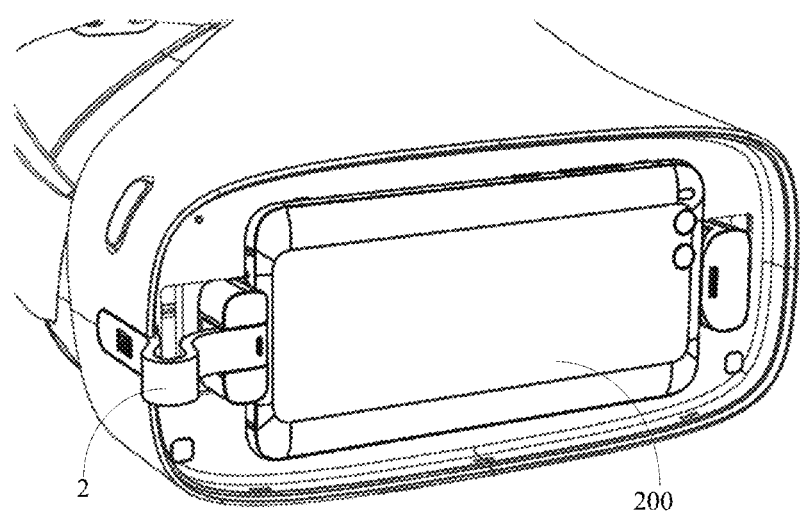
FIG. 16D is a schematic rear view illustrating assembling an external electronic device according to an aspect of the disclosure.
Figure 16E:
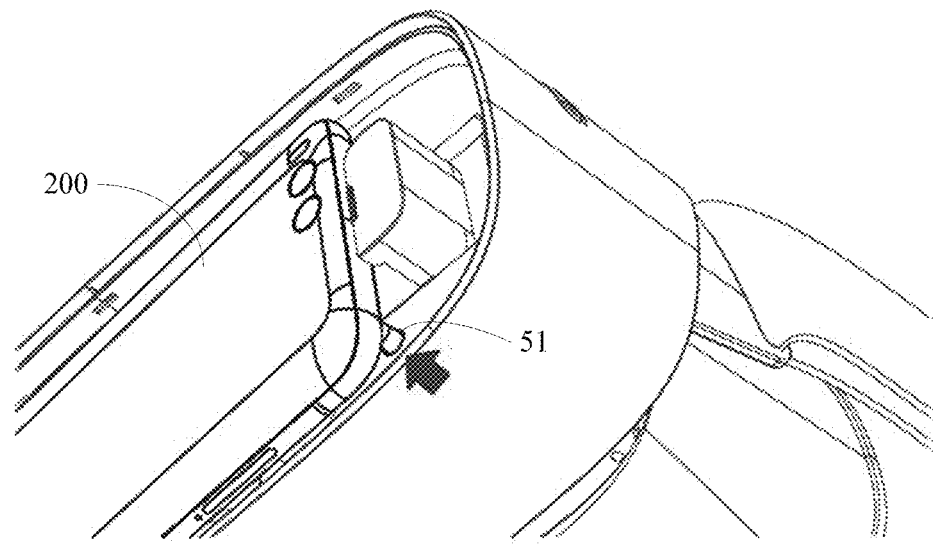
FIG. 16E is a schematic diagram illustrating a process of removing an external electronic device according to an aspect of the disclosure.
Figure 16F:
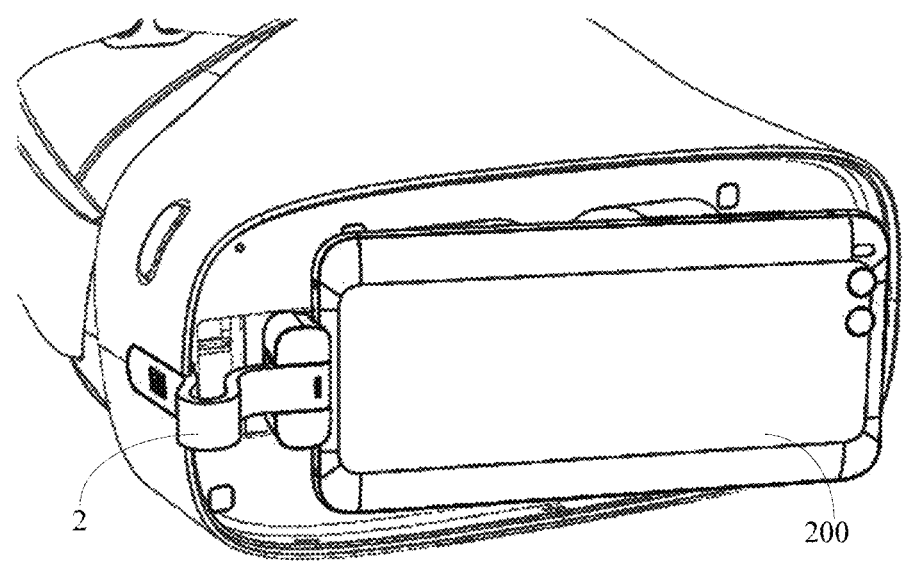
FIG. 16F is a schematic diagram illustrating a process of removing an external electronic device according to an aspect of the disclosure.
Figure 17:
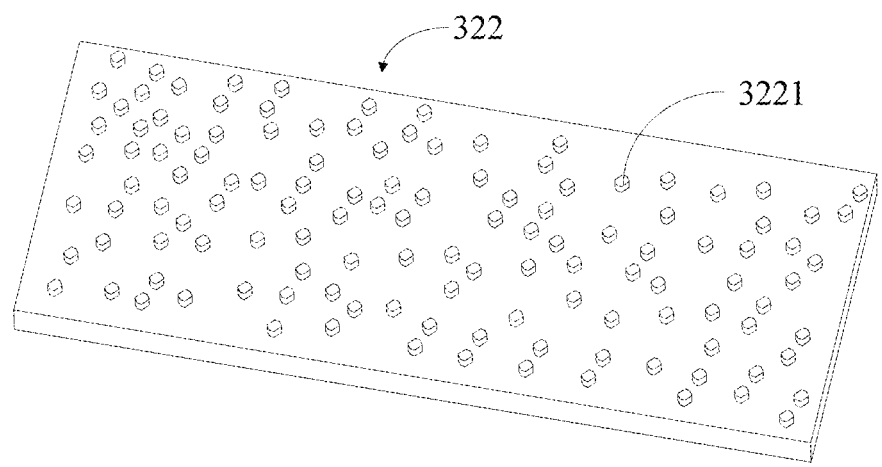
FIG. 17 is a schematic structural diagram of an abutting member according to an aspect of the disclosure.

In the above examples, the second fastening portion 32 may include an abutting member 322 abutting against a corresponding end surface of the external electronic device 200. As shown in FIGS. 16C-17, the abutting member 322 may include a plurality of protrusions 3221 disposed relative to the external electronic device 200, to increase the frictional force between the external electronic device 200 and the second fastening portion 32. Under the effect of the frictional force, the movement of the external electronic device 200 relative to the second fastening portion 32 may be restricted. Further, the abutting member 322 and/or the plurality of protrusions 3221 may be made of a material having cushioning properties, for example, a silicone rubber, an ethylene-vinyl acetate copolymer, a rubber-plastic foam made of an ethylene-vinyl acetate copolymer, etc. The present disclosure does not limit this. The housing of the external electronic device 200 may be protected from wear by the abutting member 322 and/or the plurality of protrusions 3221 having cushioning properties. The plurality of protrusions 3221 may be a columnar body arranged regularly or irregularly on the abutting member 322, or other shapes such as a strip body regularly or irregularly arranged on the abutting member 322.

As shown in FIG. 16B, in order to facilitate disassembly of the external electronic device 200, the virtual reality glasses 100 of the present disclosure may further include a device pop-up structure 5. The device pop-up structure 5 may include a support member 51 located in a predetermined opening 18 and an elastic member 52 disposed at a bottom of the support member 51. The predetermined opening 18 is located on the surface of the eyeglass body 1 opposite to the external electronic device 200, that is, on the second surface 13. For example, the elastic element 52 may include a base 521 and a spring 522. The base 521 is provided with a top opening through which the spring 522 is disposed within the base 521. The top opening is fitted to the predetermined opening 18, such that support column 51 may be fitted to the spring 522 passing through the predetermined opening 18, and thus the support column 51 and the spring 522 may be moved synchronously along the predetermined opening 18, to achieve the bouncing of the external electronic device 200.

As shown in FIG. 16C, when the external electronic device 200 is not assembled, the support member 51 may at least partially protrude from the predetermined opening 18, and the elastic element 52 has almost no deformation. As shown in FIG. 16D, when the external electronic device 200 is fastened to the corresponding surface, the external electronic device 200 may press the support member 51, such that the elastic member 52 at the bottom of the support member 51 is changed from initial state into a compressed state due to the pressure, and the support member 51 is at least partially retracted into the predetermined opening 18. For example, in the example shown in FIG. 16B, it may be understood that the spring 522 is changed from the initial state to the compressed state. As shown in FIG. 16E, when the fastening structure 3 releases the fastening to the external electronic device 200, the elastic member 52 gradually returns from the compressed state to the initial state due to the disappearance of the external force. For example, as shown in FIG. 16B, it may be understood that the spring 522 gradually returns from the compressed state to the initial state to generate a reaction force toward the external electronic device 200 and may drive the support member 51 to extend out of the predetermined opening 18 to prop up the external electronic device 200, such that a certain angle is formed between the external electronic device 200 and the corresponding surface, to facilitate the user to detach and remove the external electronic device 200, as shown in FIG. 16F.

Further, in order to prevent the second connecting plug 22 from bending relative to the second connecting portion 24 due to the upward supporting of the external electronic device 200 by the device pop-up structure 5, the device pop-up structure 5 may be disposed at a predetermined position of the periphery of the second fastening portion 32. A plurality of device pop-up structures 5 may be disposed, to maintain the balance of the external electronic device 200 during the pop-up process and avoid tilting.

Figure 18:
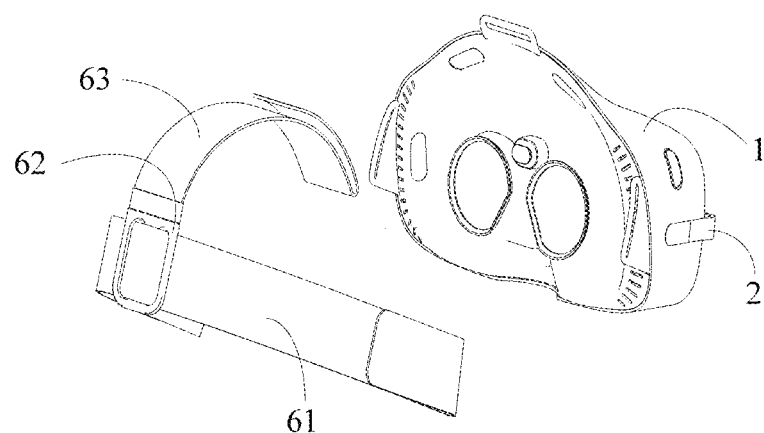
FIG. 18 is an exploded structural diagram of virtual reality glasses according to an aspect of the disclosure.

Based on the technical solution of the present disclosure, as shown in FIG. 18, the virtual reality glasses 100 may also include a wearing structure 6 for securing the eyeglass body 1 to the user's face. The wearing structure 6 may include a first strap 61, a connecting portion 62, and a second strap 63. Both ends of the first strap 61 are detachably connected to the eyeglass body 1, to form an annular structure fitted to the user's head. One end of the second strap 63 is detachably connected to the eyeglass body 1, and the other end thereof is connected to the connecting portion 62. When the virtual reality glasses 100 are in a worn state, the first strap 61 and the second strap 63 may be substantially vertical, so as to ensure the user may steadily wear of the virtual reality glasses 100.

Figure 19:
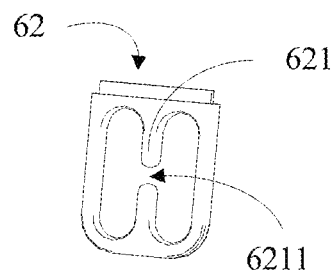
FIG. 19 is a schematic structural diagram of a connecting portion according to an aspect of the disclosure.
Figure 20:
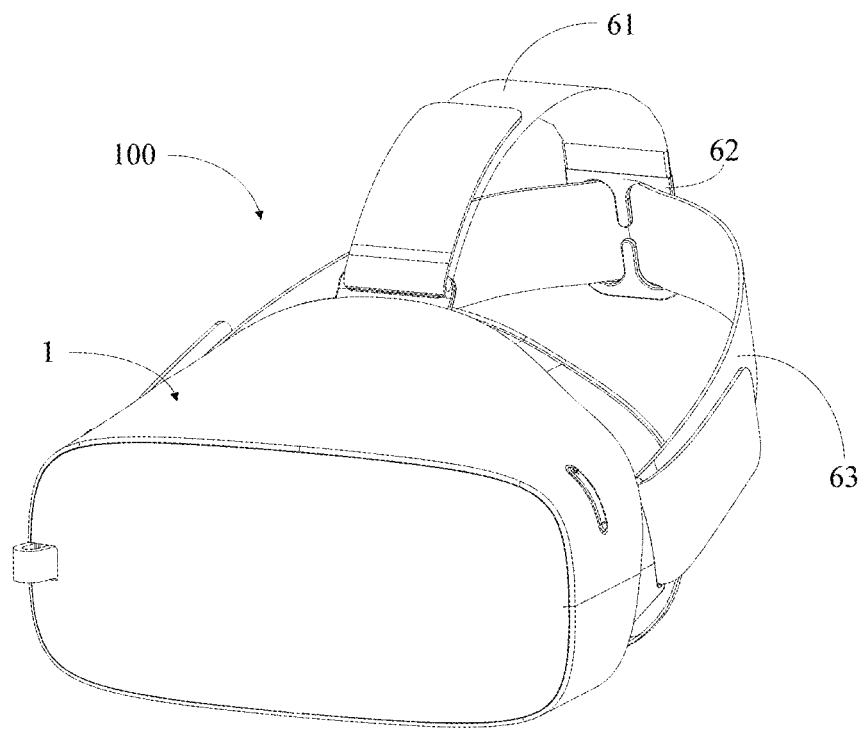
FIG. 20 is a perspective structural diagram of virtual reality glasses according to an aspect of the disclosure.

As shown in FIG. 19 and FIG. 20, the connecting portion 62 may include a blocking member 621 having an opening 6211 provided thereon, such that the first strap 61 may pass in and out the opening 6211 at one side of the connecting portion 62, to facilitate the separation between the first strap 61 and the second strap 63 and facilitate the user to wear the virtual reality glasses 100. Further, any one of the first strap 61 and the second strap 63 may be made of an elastic material, or both of them are made of an elastic material, to suit different head sizes of the users.

Figure 21:
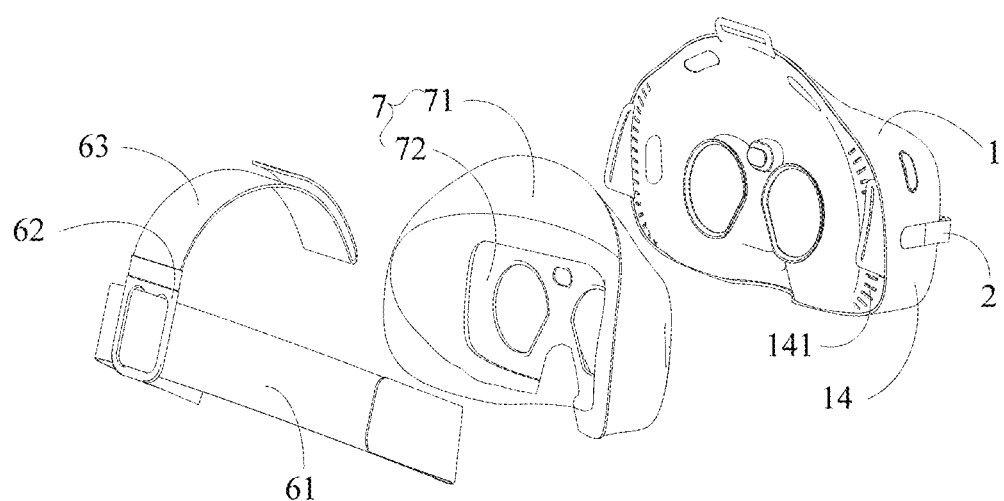
FIG. 21 is an exploded structural diagram of another virtual reality glasses according to an aspect of the disclosure.

As shown in FIG. 21, the virtual reality glasses 100 may also include a protection structure 7. The protection structure 7 may include a bonding portion 71 fitted to the surface of the eyeglass body 1 facing the user's face and a mating portion 72 fitted to the user's face and extending in the direction toward the user's face. The protection structure 7 may be made of a material with cushioning properties to improve the comfort of the user in usage. The bonding portion 71 may be adhered to the corresponding surface by adhesive bonding or Velcro bonding, which is not limited by the present disclosure.

The housing 14 may include a vent hole 141 for communicating the interior space of the housing 14 and the exterior of the housing 14 to dissipate the heat of the virtual reality glasses 100.

Optionally, the data connection cable is made of a flexible material, to adapt to a separation distance between the first interface and the second interface.

Optionally, the data connection cable includes a first connecting portion at the first end, a second connecting portion at the second end, and a data cable body between the first end and the second end, wherein at least a part of the data cable body and the first connecting portion are received in a first groove of the virtual reality glasses. The first connecting portion is configured to secure the first connecting plug with the data connection cable. The second connecting portion configured to secure the second connecting plug with the data connection cable.

Optionally, the first connecting plug is perpendicular to the connecting direction of the first end and the second end, such that the first connecting plug can be connected to the first interface within the first groove along a direction perpendicular to a surface of a housing of the virtual reality glasses.

Optionally, the first connecting plug is parallel to the connecting direction of the first end and the second end, such that the first connecting plug can be connected to the first interface within the first groove along a direction parallel to a surface of a housing of the virtual reality glasses.

Optionally, surfaces of the first connecting portion and at least a part of the data cable body are respectively flush with the surface of the housing of the eyeglass body.

Optionally, the data connection cable includes an injection molded structure, the injection molded structure at least enclosing the first connecting portion and at least a part of the data cable body, and the injection molded structure is configured to be fitted to the first groove.

Optionally, the eyeglass body includes a first fastening portion and a second fastening portion, the first fastening portion can fasten one end of the external electronic device which has the second interface, and the second fastening portion can fasten the opposite end of the external electronic device; and the second connecting portion is detachably connected to the first fastening portion.

Optionally, the second connecting portion is interference fitted to a receiving space on the first fastening portion for receiving the second connecting portion, such that the second connecting portion is fastened to the first fastening portion.

Optionally, the second connecting portion includes a second groove, the second groove is fitted to a protruding block on a side wall of the receiving space of the first fastening portion for receiving the second connecting portion, such that the second connecting portion is fastened to the first fastening portion by means of the fitting between the protruding block and the second groove.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data connection cable for virtual reality glasses, comprising:
   a first connecting plug at a first end of the data connection cable, the first connecting plug being fitted to a first interface on an eyeglass body of the virtual reality glasses, such that the data connection cable is detachably connected to the eyeglass body;
   a second connecting plug at a second end of the data connection cable, the second connecting plug being fitted to a second interface of an external electronic device assembled to the eyeglass body;
   a first connecting portion at the first end, the first connecting portion configured to secure the first connecting plug with the data connection cable;
   a second connecting portion at the second end, the second connecting portion configured to secure the second connecting plug with the data connection cable; and a data cable body between the first end and the second end,
wherein a part of the data cable body and the first connecting portion are both received in a first groove of the virtual reality glasses.

2. The data connection cable according to claim 1, wherein the data connection cable comprises a flexible material, to the data connection cable is adapted to a separation distance between the first interface and the second interface.

3. The data connection cable according to claim 1, wherein the first connecting plug is perpendicular to the connecting direction of the first end and the second end, such that the first connecting plug is connected to the first interface within the first groove along a direction perpendicular to a surface of a housing of the virtual reality glasses when the data connection cable is connected with the virtual reality glasses.

4. The data connection cable according to claim 1, wherein the first connecting plug is parallel to the connecting direction of the first end and the second end, such that the first connecting plug is connected to the first interface within the first groove along a direction parallel to a surface of a housing of the virtual reality glasses when the data connection cable is connected with the virtual reality glasses.

5. The data connection cable according to claim 1, wherein surfaces of the first connecting portion and at least a part of the data cable body are respectively flush with the surface of the housing of the eyeglass body.

6. The data connection cable according to claim 1, further comprising an injection molded structure, the injection molded structure at least enclosing the first connecting portion and at least a part of the data cable body, and the injection molded structure is configured to be fitted to the first groove.

7. The data connection cable according to claim 1, wherein the eyeglass body comprises a first fastening portion and a second fastening portion, the first fastening portion can fasten one end of the external electronic device which has the second interface, and the second fastening portion can fasten the opposite end of the external electronic device; and the second connecting portion is detachably connected to the first fastening portion.

8. The data connection cable according to claim 7, wherein the second connecting portion is interference fitted to a receiving space on the first fastening portion for receiving the second connecting portion, such that the second connecting portion is connected to the first fastening portion.

9. The data connection cable according to claim 7, wherein the second connecting portion comprises a second groove, the second groove is fitted to a protruding block on a side wall of the receiving space of the first fastening portion for receiving the second connecting portion, such that the second connecting portion is connected to the first fastening portion by means of the fitting between the protruding block and the second groove.

10. The virtual reality apparatus according to claim 1, wherein the first connecting plug is perpendicular to the connecting direction of the first end and the second end, such that the first connecting plug is connected to the first interface within the first groove along a direction perpendicular to a surface of a housing of the virtual reality glasses when the data connection cable is connected with the virtual reality glasses.

11. The virtual reality apparatus according to claim 1, wherein the first connecting plug is parallel to the connecting direction of the first end and the second end, such that the first connecting plug is connected to the first interface within the first groove along a direction parallel to a surface of a housing of the virtual reality glasses when the data connection cable is connected with the virtual reality glasses.

12. The virtual reality apparatus according to claim 1, wherein surfaces of the first connecting portion and at least a part of the data cable body are respectively flush with the surface of the housing of the eyeglass body.

13. The virtual reality apparatus according to claim 1, further comprising an injection molded structure, the injection molded structure at least enclosing the first connecting portion and at least a part of the data cable body, and the injection molded structure is configured to be fitted to the first groove.

14. The virtual reality apparatus according to claim 1, wherein the eyeglass body comprises a first fastening portion and a second fastening portion, the first fastening portion can fasten one end of the external electronic device which has the second interface, and the second fastening portion can fasten the opposite end of the external electronic device; and the second connecting portion is detachably connected to the first fastening portion.

15. The virtual reality apparatus according to claim 14, wherein the second connecting portion is interference fitted to a receiving space on the first fastening portion for receiving the second connecting portion, such that the second connecting portion is connected to the first fastening portion.

16. The virtual reality apparatus according to claim 14, wherein the second connecting portion comprises a second groove, the second groove is fitted to a protruding block on a side wall of the receiving space of the first fastening portion for receiving the second connecting portion, such that the second connecting portion is connected to the first fastening portion by means of the fitting between the protruding block and the second groove.

17. The virtual reality apparatus according to claim 1, wherein position and structure of the first connecting plug is configured to be adaptively changed to facilitate that the first groove receives the first connecting portion and at least the part of the data cable body.

18. A virtual reality apparatus, comprising:
virtual reality glasses and a data connection cable, the data connection cable comprising:
a first connecting plug at a first end of the data connection cable, the first connecting plug being fitted to a first interface on an eyeglass body of the virtual reality glasses, such that the data connection cable is detachably connected to the eyeglass body;
a second connecting plug at a second end of the data connection cable, the second connecting plug being fitted to a second interface of an external electronic device assembled to the eyeglass body;
a first connecting portion at the first end, the first connecting portion configured to secure the first connecting plug with the data connection cable;
a second connecting portion at the second end, the second connecting portion configured to secure the second connecting plug with the data connection cable; and
a data cable body between the first end and the second end, wherein a part of the data cable body and the first connecting portion are both received in a first groove of the virtual reality glasses.

19. The virtual reality apparatus according to claim 10, wherein the data connection cable comprises a flexible material, to the data connection cable is adapted to a separation distance between the first interface and the second interface.

* * * * *